(No Model.) 7 Sheets—Sheet 1.
J. C. H. STUT.
TELEPHONE TRANSMITTER.
No. 355,952. Patented Jan. 11, 1887.
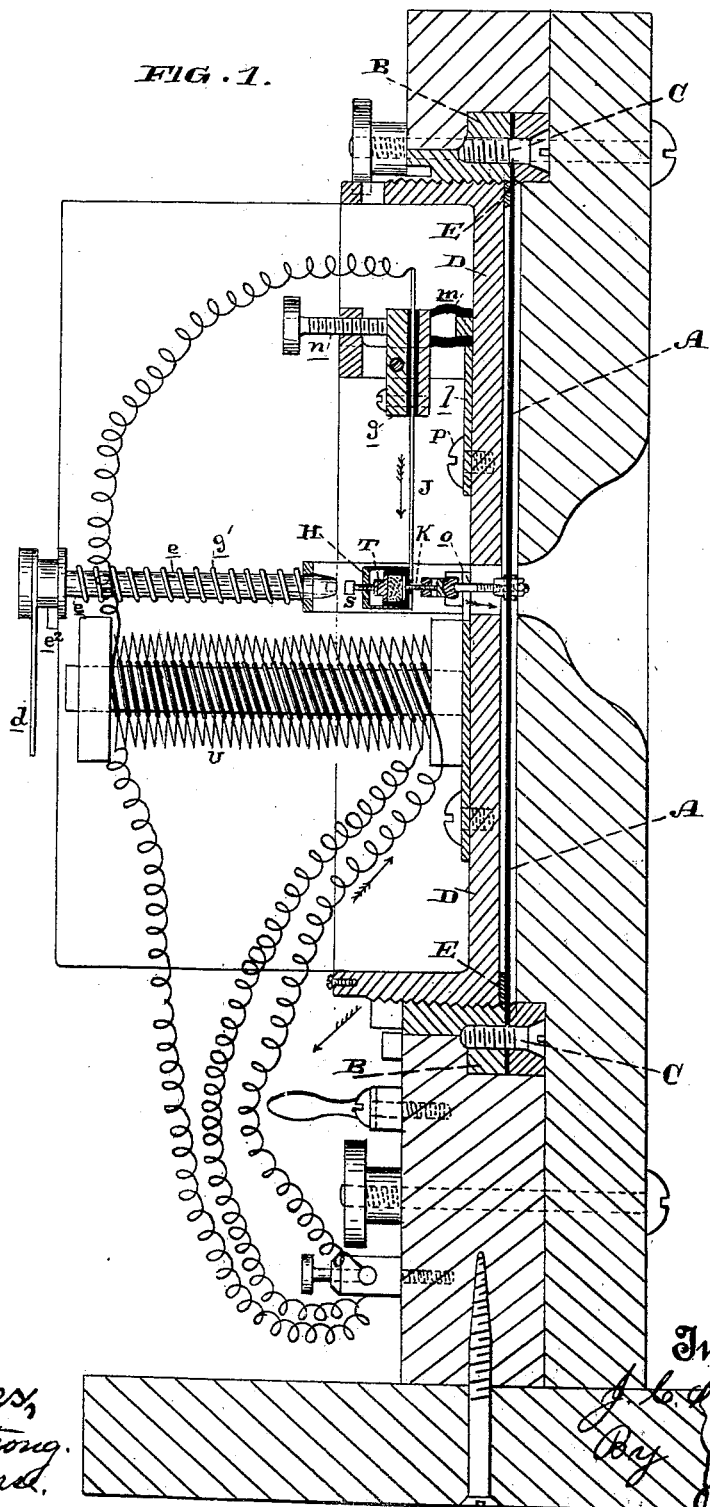

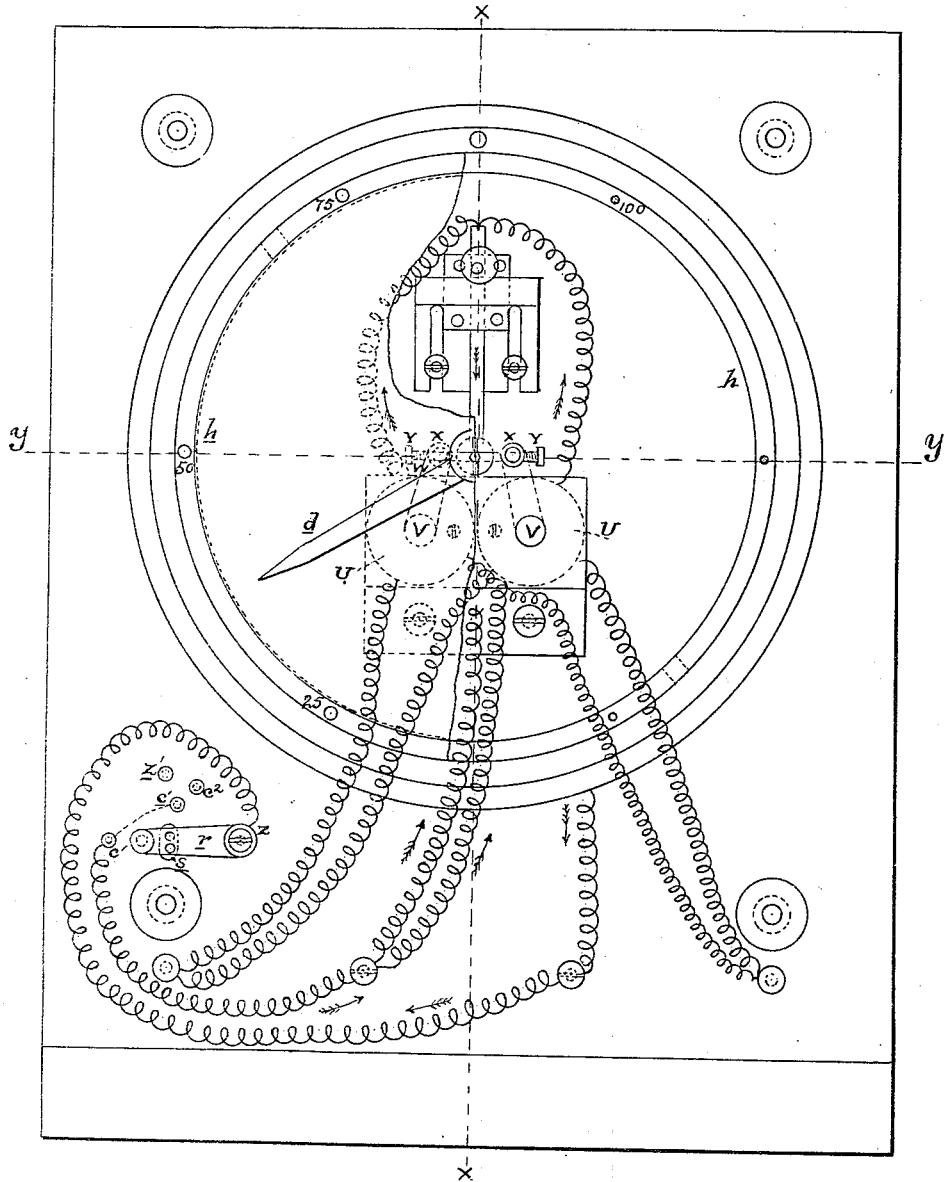

(No Model.) 7 Sheets—Sheet 3.
J. C. H. STUT.
TELEPHONE TRANSMITTER.
No. 355,952. Patented Jan. 11, 1887.
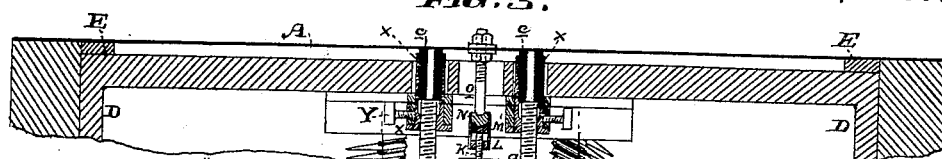
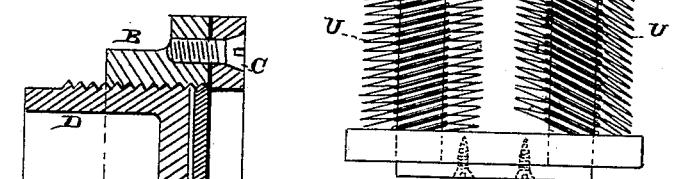
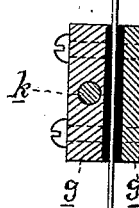
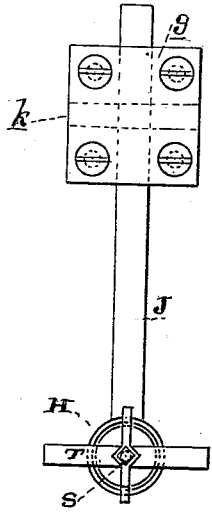
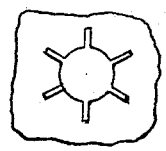
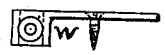
Witnesses,
Geo. H. Strong.
Inventor,
J. C. H. Stut
By Dewey & Co.
att'ys (No Model.)   7 Sheets—Sheet 4.

J. C. H. STUT.
TELEPHONE TRANSMITTER.

No. 355,952.   Patented Jan. 11, 1887.

Witnesses,
Geo. H. Strong.

Inventor,
J. C. H. Stut
By Dewey & Co.
attys (No Model.) 7 Sheets—Sheet 5.

J. C. H. STUT.
TELEPHONE TRANSMITTER.

No. 355,952. Patented Jan. 11, 1887.

Witnesses,
Geo. H. Strong
J. H. Norris

Inventor,
J. C. H. Stut
By Dewey & Co.
atty

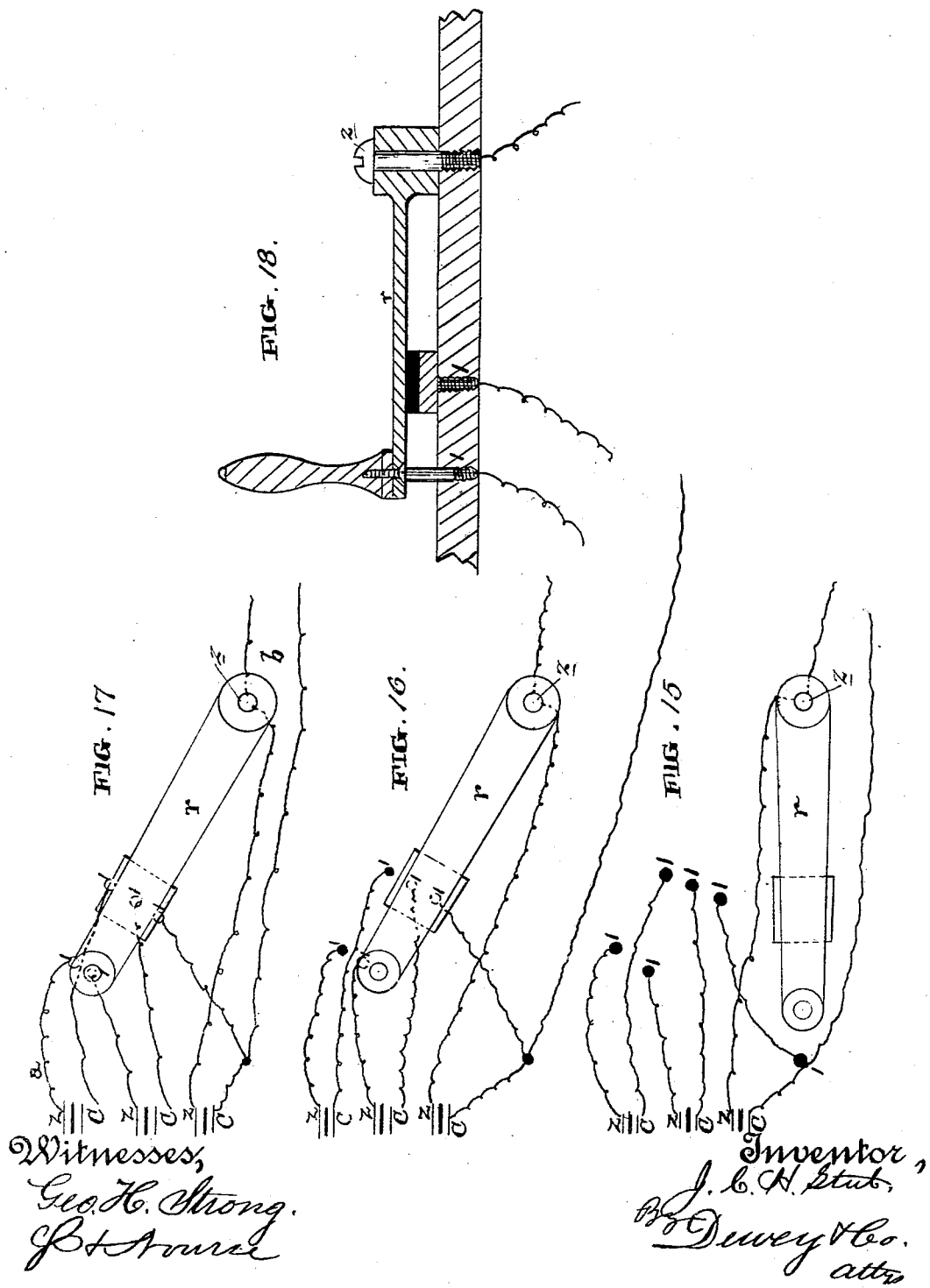

(No Model.) 7 Sheets—Sheet 7.

J. C. H. STUT.
TELEPHONE TRANSMITTER.

No. 355,952. Patented Jan. 11, 1887.

Witnesses
Geo. H. Strong

Inventor
J. C. H. Stut
By Dewey & Co,
attys

UNITED STATES PATENT OFFICE.

JOHN CHRISTIAN HENRY STUT, OF SAN FRANCISCO, CALIFORNIA.

TELEPHONE-TRANSMITTER.

SPECIFICATION forming part of Letters Patent No. 355,952, dated January 11, 1887.

Application filed February 17, 1886. Serial No. 192,296. (No model.)

*To all whom it may concern:*

Be it known that I, JOHN CHRISTIAN HENRY STUT, of the city and county of San Francisco, State of California, have invented an Improvement in Telephones; and I hereby declare the following to be a full, clear, and exact description of the same.

My invention relates to certain improvements in telephones; and its object is to construct a transmitting-telephone which will produce a larger volume of sound, heretofore available by giving a larger variation to the intensity of the current in both the primary and secondary circuits, so that conversation may be carried on over a greater distance of line-wire and better overcoming the extraneous inductions, leaks, and resistances.

It consists of a diaphragm of large diameter, with means for regulating the radial tension and making a softer and more melodious tone; unstable contact-points, and a multiple variable-resistance contact, adjustable poles in connection with the induction-coils, and a means for adjusting the contacts for different distances over which communication may take place, and means for providing a damper for the diaphragm by the aid of the magnetic current, to increase and decrease the vibrations of the diaphragm, together with certain details of construction, all of which will be more fully explained by reference to the accompanying drawings, in which—

Figure 10:
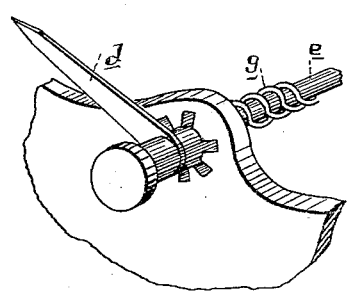
Figure 11:
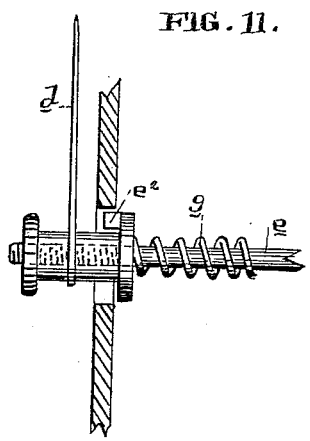
Figure 12:
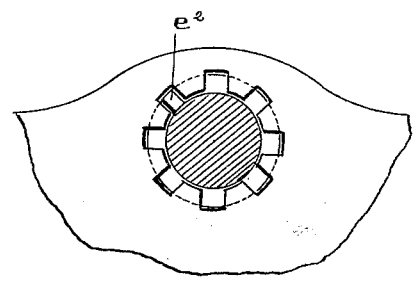
Figure 14:
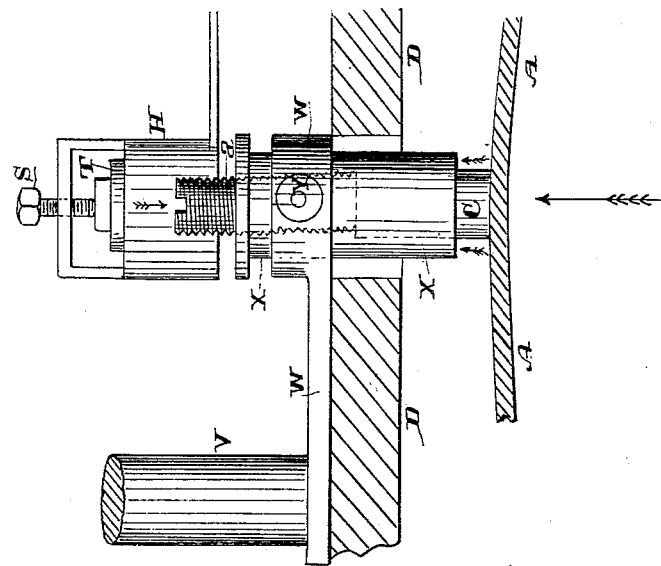
Figure 13:
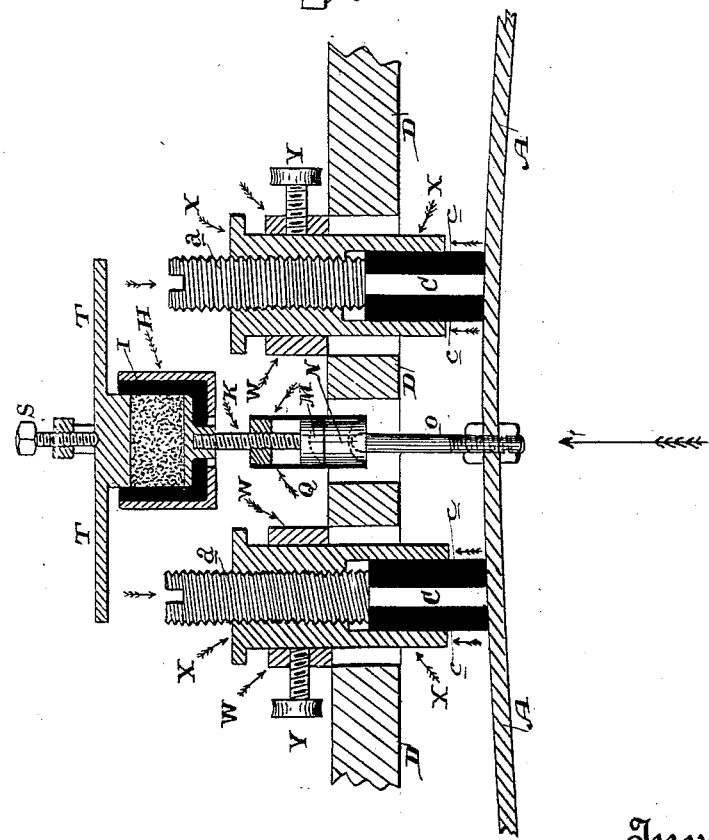
Figure 21:
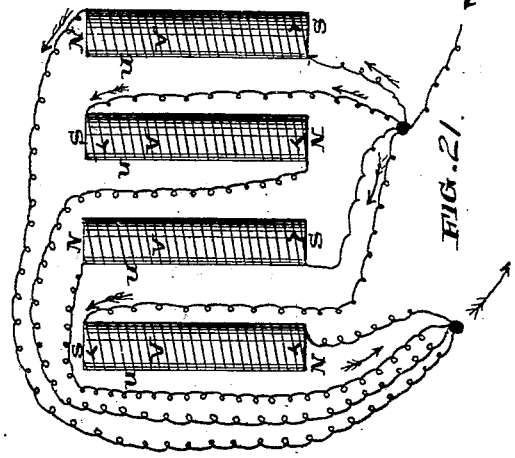
Figure 20:
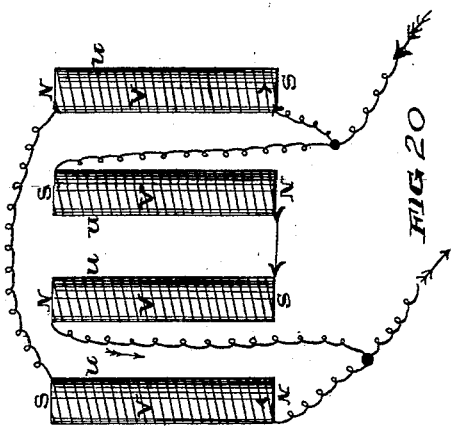
Figure 19:
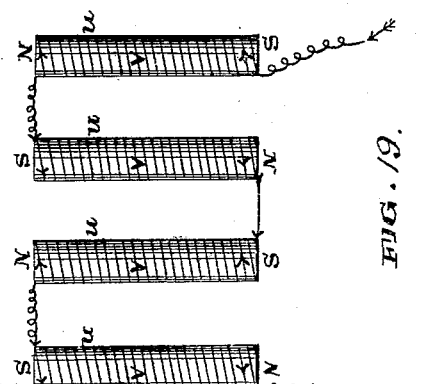
Figure 22:
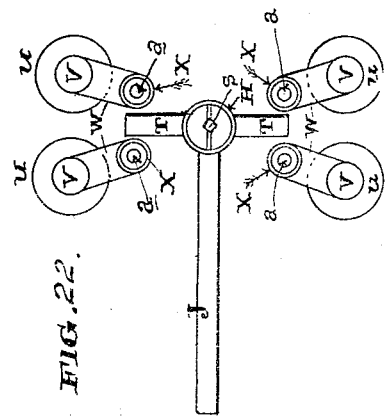

Figure 1 is a vertical section taken through X X of Fig. 2. Fig. 2 is a rear view showing the induction-coils, connecting-wires, switches, and variable pointer or index-hand. Fig. 3 is a horizontal section taken through Y Y of Fig. 2. Fig. 4 is a vertical section of the diaphragm with its adjustments. Figs. 5 to 22, inclusive, are enlarged detail views of different portions of the apparatus.

A is the diaphragm, which is made of steel, and of much larger diameter than the transmitters hitherto made, so as to increase the amplitude of vibrations when it is acted upon by the sound-waves, and giving thereby a larger variation of intensity of current. This diaphragm, being made of tempered or hardened steel, is quicker in its movements than iron or any other known metal or substance, and I therefore prefer it, although diaphragms of other material might be used. The periphery of this diaphragm is secured in a circular ring or disk, B, by screws C passing through its edge at suitable intervals. The inside of this ring or disk is screw-threaded, and has fitted to it a disk, D, with screw-threads upon its periphery, so that it can be screwed in or out in the outer ring. Around the inner circumference of this ring B is an elastic rubber ring, E, which rests against the diaphragm.

When the screw-disk D is screwed into the ring B, it presses against this rubber ring, forcing it against the diaphragm, thus giving the diaphragm a uniform radial or outward tension all around its circumference. This varies the timbre of the sound produced in the receiving-telephone, and it also enables me to prevent unnecessary vibrations of the diaphragm. A soft-rubber ring prevents the metallic ringing sound which might otherwise take place. In some cases a flat rubber disk, F, might be used, as shown in Fig. 4; this disk covering the whole of one side of the diaphragm, except a small hole in the middle, through which the pin *o* passes, this pin being secured to the center of the diaphragm, as shown, by nuts upon opposite sides, or other suitable means, and serving to make the contacts, as will be hereinafter described. The disk D will also have a hole through it for the same purpose.

Between the rubber disk F, when used, and the screw-disk D, I fit a paper disk, G, so as to lie between the rubber and the metal surfaces of D and F. (Shown in Fig. 4.) This allows the screw-disk to be turned around without wrinkling or disturbing the rubber, as the friction between the paper and the brass is less than between the rubber and the brass.

H is a cup made of non-magnetic material, having in its interior an insulating-lining, I, and within this is placed carbon in a finely-divided or granulated condition, which is thus insulated from the exterior of the cup. This cup may be made of any convenient shape or size, and is supported by an insulated elastic adjustable arm, J, as shown in Figs. 5, 6, and 7. The opposite end of this spring-arm passes between insulators between plates *g*, being clamped firmly by the screws which hold these plates together. The clamp thus described has a pin, *k*, passing through it transversely to the line of the spring-arm, this pin being journaled or held in standards from a plate, l, so that the clamp, spring, and cup may be moved about the pin as a fulcrum.

Beneath the rear end of the clamp is an elastic rubber tube or block, m, and a thumb-screw, n, passes through a nut or plate fixed to the standard above, so that by turning it the clamp is rocked about its fulcrum-pin, and the spring-arm J, with its supported carbon-containing cup H and contacts, is brought against the pin o of the diaphragm with more or less pressure, as desired. The base-plate l is slotted, and its holding-screws P pass through the slots into screw-disk D, so that by loosening them the plate, and with it the fulcrum-standards and clamp, may be shifted, so as to increase or decrease the stiffness of the spring-arm J by shortening or lengthening it.

An insulated screw, K, extends outward from the side of the cup H toward the pin o, its inner end entering a socket which extends out through the insulated bottom of cup H, and has a platinum plate within the cup upon which the carbon rests. This screw passes out through a nut, L, and has upon its outer end a head, M, the outer side of which is made concave or flat, so as to receive the convex or flat end of the carbon piece N. The outer end of this carbon contact-piece may be flat or of other shape, but is preferably concave, so that the rounded platinum-tipped end of the pin o may enter this carbon-cup. By means of the nut L turning on screw K the resistance of the unstable contact between the head of the screw and the piece N may be varied as desired.

The nut L is connected with the carbon piece N by means of a soft-rubber tube, Q, which passes over the nut and is fastened to it, and from it to the carbon piece N, as shown. By means of this the stability of the contact between the hollow screw-head M and the carbon piece N may be varied. The contact between the hollow end of the carbon piece N and the platinum-pointed pin o of the diaphragm is regulated by a thumb-screw. Through a cross-bar on the rear of the carbon-cup H a screw, S, passes, pressing against the back of the iron platinum-plated plate T, (shown in detail in Figs. 5, 6, and 7,) so that it may be made to compress the finely-divided carbon within the cup to a greater or less degree, and by thus altering its compression the resistance of the primary circuit caused by this divided carbon will be varied as desired. By means of these varying resistances of the multiple contact in the carbon-cup and the two unstable contacts between the point of pin o and the cup a very great sensitiveness and volume and intensity of sound are produced in the receiving-telephone.

U U are the coils of a double inductorium, having the cores V, provided with pole-pieces W, (shown in detail in Fig. 9, which is a side view,) which extend to a considerable distance to one side, as shown in Fig. 2. These pieces have fitted in their ends screw-threaded tubes X, which are held in any desired position by small binding-screws Y, as shown in Fig. 3, so that they may be held at points more or less remote from the surfaces of the diaphragm. Extending outward from these tubes X are screws a, the heads of which reach to a point in close proximity with the wings of the soft-iron platinum-plated plate T, which is held by the screw S, so as to press upon the finely-divided carbon in the cup H.

The screws a may be adjusted in or out of the tubes X X, so as to bring them nearer to or farther away from the wings of the plate T, as desired.

The operation of the apparatus will then be as follows: If a sound-wave strikes the diaphragm, causing the pin o to be pressed more intimately against the carbon contact-piece N, the screw-head M, and the divided or granulated carbon in the cup H, it reduces thereby the resistance in the primary circuit, which increases in turn the magnetism of the cores V. This is effected as follows: When a sound-wave strikes the diaphragm, it attains a certain momentum, and acts through the pin o upon the carbon piece N, which, being light, will be similarly affected. The cup H, containing the divided carbon, being heavier, will not be acted upon so readily or so quickly because of its inertia, besides being acted upon by the spring J, which presses it toward the pin o. The first impulse will therefore produce a very intimate contact between the unstable and the multiple contact-points, followed by an opposite movement or vibration, which lessens or reduces it in a corresponding degree.

The cores V have extending pole-pieces W, which are hollow, as shown in Fig. 9, and through which tubes X pass, which act on the diaphragm and the soft-iron plate or piece T, (see Fig. 22,) which presses on the carbon in the cup H, and has its ends extended beyond the sides of the cup, as shown, so that the increased magnetism helps to reduce the resistance in the primary circuit by drawing the diaphragm and the cover or plate T of the cup more closely together, or by opposite action, causing a greater variation of the current than can be produced in any other manner. In illustration, it might be stated that the magnetic rays pass from one end of the positive pole through the plate or piece T, thence through the negative pole to the diaphragm, thence back again to the other end of the positive pole, or the point of starting. By variation of the magnetism in the cores and the pole-pieces the induced magnetism of the diaphragm and the magnetic plate or piece T is also varied, and this variation of induced magnetism in the diaphragm, pole-pieces, and the plate helps to strengthen or weaken the induced current in the secondary coils. It also helps to make microphonic contact more or less intimate, as required. By extending the tubes X through the pole-pieces of the induction-coils close to the diaphragm a damper is formed, which prevents undue vibration of the same, this being effected by the magnetism of the pole-pieces and the greater or less compression of the rubber pieces.

The screw-threaded tubes X (see Figs. 13 and 14,) each contain a soft-rubber piece, $c$, which is inserted in them, and bear against the diaphragm with greater or less pressure, being regulated by the screws, as before described. These elastic pieces also act to take away or reduce the metallic ring of the diaphragm. Two or more induction-coils may be used, connected parallel, or for quantity, thus giving much less resistance to the primary circuit than if connected for intensity; or four induction-coils may be employed, all connected for quantity, or two may be employed connected for quantity, and two for intensity.

In connection with the primary induction-coils connected as above described, I have the secondary coils connected in the same manner, either for intensity or quantity, or one pair for intensity and one for quantity. A switch is so arranged that one, two, or more sets of batteries may be connected in the primary circuit, so that when speech or music is transmitted over a short line or through small resistance one set of batteries only may be used, and when used for long lines or greater resistance more batteries may be connected. The construction and arrangement of this switch is plainly shown in Figs. 2, 15, 16, 17, and 18, where $r$ is the switch-lever, having its fulcrum or pivot pin at the point $z$, which also connects with the zinc or positive of one battery, the negative or carbon of which is shown at $c'$. $z'$ is the positive, and $c^2$ the negative, of a second battery. The bar $r$ has a metallic plate, $s$, beneath it, as shown, and insulated from the bar itself. The carbons $c'$ $c^2$ being united, as shown, when the switch-bar $r$ is turned about its pivot until its outer end rests upon $z'$, the bar will unite the zinc or positive poles, and the plate $s$ will unite the carbon or negative poles $c'$ $c^2$. The switch may also be similarly arranged to unite the pairs for intensity. It will be manifest that by a similar arrangement other pairs might be combined to still further increase the desired effect. $d$ is a pointer or index-hand fixed upon the end of the shaft $e$, so that the former may be turned by turning the latter. This shaft is surrounded by a spiral spring, $g'$, to keep it in position, and its lower end has a socket formed to fit over the head of the screw S. By pressing the shaft $e$ downward until the socket in its inner end fits over the head of the screw, and then turning the pointer or index $d$ in one direction, pressure may be brought upon the loose carbon in the cup H, or the pressure may be reduced by turning in the opposite direction, thus decreasing or increasing the resistance in the same. For instance, if a communication is to take place over a distance of fifty miles, the pointer may be turned to a point on the dial $h$ indicating that distance, the shaft $e$ having been pressed in, so that the screw S would be turned simultaneously with the pointer. Now, if a communication is required over a distance of one hundred miles, the shaft is pressed inward until its inner end engages the screw S, and the index-hand is then turned to a point on the dial indicating one hundred miles, and the carbon in the cup will be compressed by this action, so as to decrease the resistance by making it more solid, and consequently increasing the proportion of variation in the primary and in the secondary circuits. The shaft $e$ has a feather, $e^2$, upon one side, near its upper end, and the plate or guide through which the shaft passes has radial slots made in it corresponding in length with the width of the feather, as shown in detail in Fig. 8, which is a plan of holes with slots. The action of the spring $g'$ holds the shaft in such a position ordinarily that the feather will stand in one of these slots. When the pointer or index is to be turned, the shaft $e$ is pressed inward until the feather $e^2$ is clear of the slot in which it stood, and the shaft will be free to be turned. When released, the spring forces the feather up into the slot, opposite which it is stopped. These slots may thus serve to hold the shaft and index at either of the points desired.

The current of electricity runs from the battery to the primary coils, and thence to the spring-arm J through cross-bar of cup H, screw S, plate T, multiple and unstable contacts to diaphragm, and thence back again to the battery, as indicated by the arrows. The heavy spiral lines indicate the primary coils, and the lighter ones the secondary wires. To illustrate, it is assumed that the primary circuit and contacts have a resistance of two ohms, the battery a resistance of two ohms, making a total resistance of four ohms in the primary circuit. Let it be assumed that a sound-wave striking the diaphragm reduces its resistance in contacts one-half ohm, which would be in proportion of the total resistance of one to eight. If another battery be now added, which would reduce the battery resistance to one ohm, and the screw S, acting upon the plate T of the carbon cup H, be turned so as to reduce the resistance in the multiple contact, say, one-half ohm, this would give a proportion of one to five, which is a large and favorable increase.

The extra battery is added to the primary circuit by means of the switch shown at $r$. The large screw-disk D is turned by means of a spanner or lever fitting holes in its circumference, or by other suitable means, and after the tension has been properly adjusted the telephone itself may be adjusted to the proper position by loosening the screws in the frame by which it is held in position and again tightening them when it is in the proper position.

Having thus described my invention, what I claim as new, and desire to secure by Letters Patent, is—

1. The tempered steel or iron diaphragm having its periphery secured continuously in a surrounding ring, in combination with a smaller disk having its periphery screw-threaded to fit the corresponding threads inside the diaphragm-ring, and a supplemental ring fitted between the disk and the diaphragm, whereby pressure upon the latter may be increased or diminished, as described.

2. The hardened or tempered steel or iron diaphragm having its periphery continuously secured in the surrounding ring, said ring having screw-threads in its interior, a smaller disk having screw-threads upon its periphery to fit those within the diaphragm-ring, whereby it may be advanced to or retracted from the diaphragm, and parallel therewith, in combination with the elastic ring or disk fitted between the metallic disk and diaphragm, substantially as and for the purpose herein described.

3. The metallic diaphragm having its periphery fixed in a surrounding ring having interior screw-threads, and a screw-threaded disk fitted in this ring, so as to be advanced to or retracted from the diaphragm, an elastic ring or disk between it and the diaphragm, in combination with the paper disk intermediate between the metallic disk and the elastic ring or disk, having a surface over which the metal disk or screw may move without actual contact with the rubber, substantially as described.

4. The hardened or tempered steel or iron diaphragm having its periphery continuously fixed in a surrounding ring, a disk by which a uniform tension of the diaphragm may be produced, and an interposed elastic ring or disk, in combination with the metal pin having one end centrally secured in the diaphragm, and a carbon-cup secured with relation thereto, so that the vibration of the diaphragm produces an unstable contact between the pin and the carbon, substantially as herein described.

5. The diaphragm having its periphery fixed in a surrounding ring, a screw-threaded disk fitted in this ring upon one side of the diaphragm, with an elastic ring or disk between it and the diaphragm, in combination with a second disk, G, having a surface over which the metal disk may move with a minimum of friction, and without actual contact with the rubber, substantially as herein described.

6. The diaphragm having its periphery supported and its tension adjusted as shown, and a central pin fixed to the diaphragm and extending inwardly to one side, in combination with the cup containing pulverized carbon, whereby a multiple contact is provided, a screw extending upward from said cup and connecting with a solid piece of carbon at the opposite end, which forms an unstable contact with the pin extending from the diaphragm, substantially as herein described.

7. A cup having an insulated lining within which the pulverized carbon is contained, a screw extending from the cup toward the diaphragm, having a solid piece of carbon held in contact with it by means of a rubber or elastic tube or holder, in combination with a metallic pin, having one end secured centrally to the diaphragm, and the other forming an unstable contact with the carbon, substantially as herein described.

8. A cup having its interior insulated and containing finely-divided carbon, from which an unstable contact is made with the diaphragm upon one side, in combination with a magnetic compression-plate upon the opposite side of the unmagnetic cup, and a screw acting upon said plate, whereby the carbon may be compressed more or less, so as to reduce its resistance in the circuit, substantially as herein described.

9. The cup containing finely-divided carbon, forming a multiple contact in the circuit of a telephone, a screw acting upon a compression-plate, whereby the resistance of this carbon may be increased or decreased by its greater or less compression, in combination with a stem or shaft having a socket at one end fitting the compression screw, so as to turn an index-hand or pointer moving over a dial, which may be turned to produce and indicate the compression, substantially as herein described.

10. The induction-coils having cores with extended pole-pieces, in combination with the hollow cylindrical adjustable tubes extending from these pole-pieces toward the diaphragm, and the adjustable screws fitted within these tubes, whereby the magnetism induced by the electric current is made to act upon the diaphragm with varying intensity, substantially as herein described.

11. The cup containing the finely-divided carbon, forming a multiple contact and varying resistance, and the unstable contacts whereby connection is made between it and the diaphragm, the induction-coils with their cores, extended pole-pieces, the adjustable tubes extending toward the diaphragm, and the screws adjustable within these tubes, in combination with the plate or cap of the unmagnetic cup containing granulated carbon and extending outwardly over the ends of the screws, substantially as herein described.

12. The tubes extending toward the diaphragm from the pole-pieces of the induction-coils, with their adjusting-screws, as shown, in combination with the elastic pieces extending from the tubes and forming dampers to prevent undue vibration or metallic tone of the diaphragm, substantially as herein described.

13. The cup having an insulated lining, within which the pulverized carbon is contained, a platinum or metallic bottom upon which the carbon rests, having the insulated socket extending out through the bottom of the cup, in combination with a screw fitting said socket, carrying upon its outer end a solid piece of carbon, a nut upon said screw, with a rubber or elastic connection between it and the carbon, whereby the contact is varied, in combination with the diaphragm, having a pin passing through its center and forming a contact with the carbon piece, substantially as herein described.

14. The carbon-containing cup, in combination with the elastic arm or spring, upon one end of which it is fixed, and an insulated clamp or holder between which the opposite ends of the spring are held and adjusted, substantially as herein described.

15. The spring-arm supporting at one end the cup containing loose carbon, a clamp between which the opposite ends of the spring are held, said clamp having a pin or journals upon which it turns, in combination with a rubber or elastic cushion beneath the rear end of the clamp, and a screw pressing upon its opposite side, whereby the clamp may be turned about its journal-pin, substantially as herein described.

16. The carbon-containing cup mounted upon one end of a spring or elastic arm, the opposite end of which is clamped between insulated plates, made adjustable, as shown, in combination with standards, and a plate upon which the clamp is supported, said plate being slotted and held to the base by screws passing through said slots, whereby it may be adjusted to or from the center, substantially as herein described.

17. A device for varying the resistance in the primary circuit when speaking over long or short distances, consisting of a diaphragm with the stable and unstable points, as shown, in combination with the switch $r$ and insulated plate $s$, whereby two or more batteries may be connected for quantity, and united with the described mechanism, substantially as herein described.

18. The mechanism, substantially as described, for increasing and decreasing the resistance of the primary circuit in a telephone, consisting of a cup containing granulated carbon, and devices, comprising the plates $s$ and T, for varying the resistance therein, in combination with the switch, whereby one or more additional batteries may be brought into the circuit, so as to increase the quantity and reduce the resistance, substantially as described.

19. In a telephone, the means for increasing the amplitude of vibration of the diaphragm, consisting of a mechanism comprising the tubes X and the screws $a$ in the pole-pieces N, whereby both positive and negative magnetic currents are employed to draw the diaphragm toward the contact-cup, and at the same time draw the cup toward the diaphragm, substantially as described.

20. In a telephone, the mechanism for increasing the amplitude of vibration of the diaphragm, consisting of the tubes X and screws $a$ in the pole-pieces W, in combination with the diaphragm and contact-cup, substantially as herein described.

21. In a telephone, a mechanism for increasing the undulations in an undulatory current, consisting of the multiple contacts in the cup H, and the plate T, connected therewith, and the two unstable contacts, in combination with the tubes X and screws $a$ in the pole-pieces, substantially as herein described.

22. The diaphragm having its periphery secured and adjusted by means of a screw-disk and ring, as shown, in combination with the exterior case or frame formed of two sections, clamping-screws by which these sections are pressed together so as to hold the telephone, and by which the position of the telephone within the frame may be changed or adjusted, substantially as described.

23. The multiple-contact mechanism consisting of the compression-plate and screw, by which the compression, and consequent resistance, is varied, in combination with the index-hand connected with said screw, and the dial upon which figures are imprinted, indicating the distance of communication corresponding with the amount of compression caused by turning the screw and index-hand, substantially as herein described.

In witness whereof I have hereunto set my hand.

JOHN CHRISTIAN HENRY STUT.

Witnesses:
  S. H. NOURSE,
  H. C. LEE.